(12) United States Patent
Ashikawa et al.

(10) Patent No.: US 10,304,460 B2
(45) Date of Patent: May 28, 2019

(54) CONFERENCE SUPPORT SYSTEM, CONFERENCE SUPPORT METHOD, AND COMPUTER PROGRAM PRODUCT

(71) Applicant: Kabushiki Kaisha Toshiba, Minato-ku, Tokyo (JP)

(72) Inventors: Taira Ashikawa, Kawasaki Kanagawa (JP); Kosei Fume, Kawasaki Kanagawa (JP); Masayuki Ashikawa, Kawasaki Kanagawa (JP); Hiroshi Fujimura, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 224 days.

(21) Appl. No.: 15/440,550

(22) Filed: Feb. 23, 2017

(65) Prior Publication Data

US 2018/0082688 A1 Mar. 22, 2018

(30) Foreign Application Priority Data

Sep. 16, 2016 (JP) .................................. 2016-182175

(51) Int. Cl.
*G10L 15/00* (2013.01)
*G10L 15/26* (2006.01)
(Continued)

(52) U.S. Cl.
CPC ............ *G10L 15/265* (2013.01); *G10L 15/08* (2013.01); *G10L 15/26* (2013.01); *G10L 25/78* (2013.01);
(Continued)

(58) Field of Classification Search
CPC ........................................................ G10L 15/00
(Continued)

(56) References Cited

U.S. PATENT DOCUMENTS

| 8,107,604 B2 | 1/2012 | Katis et al. |
| 8,121,270 B2 | 2/2012 | Katis et al. |

(Continued)

FOREIGN PATENT DOCUMENTS

| JP | 2001-142487 | 5/2001 |
| JP | 2003-131692 | 5/2003 |

(Continued)

*Primary Examiner* — Michael C Colucci
(74) *Attorney, Agent, or Firm* — Knobbe, Martens, Olson & Bear, LLP

(57) ABSTRACT

According to an embodiment, a conference support system includes a recognizer, a classifier, a first caption controller, a second caption controller, and a display controller. The recognizer is configured to recognize text data corresponding speech from a speech section and configured to distinguish between the speech section and a non-speech section in speech data. The classifier is configured to classify the text data into first utterance data representing a principal utterance and second utterance data representing another utterance. The first caption controller is configured to generate first caption data for displaying the first utterance data without waiting for identification of the first utterance data to finish. The second caption controller is configured to generate second caption data for displaying the second utterance data after identification of the second utterance data finishes. The display controller is configured to control a display of the first caption data and the second caption data.

9 Claims, 20 Drawing Sheets

US 10,304,460 B2
Page 2

(51) Int. Cl.
*G10L 15/08* (2006.01)
*H04M 3/56* (2006.01)
*G10L 25/78* (2013.01)
*G10L 25/51* (2013.01)
*G10L 25/21* (2013.01)

(52) U.S. Cl.
CPC ............. *H04M 3/567* (2013.01); *G10L 25/21*
(2013.01); *G10L 25/51* (2013.01); *H04M 2201/40* (2013.01)

(58) Field of Classification Search
USPC ..... 704/500, 9, 275, 270, 250, 246; 707/769
See application file for complete search history.

(56) References Cited

U.S. PATENT DOCUMENTS

| | | | |
|---|---|---|---|
| 8,121,271 B2 | 2/2012 | Katis et al. | |
| 8,130,921 B2 | 3/2012 | Katis et al. | |
| 8,175,234 B2 | 5/2012 | Katis et al. | |
| 8,180,029 B2 | 5/2012 | Katis et al. | |
| 8,180,030 B2 | 5/2012 | Katis et al. | |
| 8,243,894 B2 | 8/2012 | Katis et al. | |
| 8,311,050 B2 | 11/2012 | Katis et al. | |
| 8,345,836 B2 | 1/2013 | Katis et al. | |
| 8,526,456 B2 | 9/2013 | Katis et al. | |
| 8,532,270 B2 | 9/2013 | Katis et al. | |
| 8,565,149 B2 | 10/2013 | Katis et al. | |
| 8,645,137 B2* | 2/2014 | Bellegarda | G10L 17/04 704/250 |
| 8,670,531 B2 | 3/2014 | Katis et al. | |
| 8,687,779 B2 | 4/2014 | Katis et al. | |
| 8,693,647 B2 | 4/2014 | Katis et al. | |
| 8,705,714 B2 | 4/2014 | Katis et al. | |
| 8,718,244 B2 | 5/2014 | Katis et al. | |
| 8,719,006 B2* | 5/2014 | Bellegarda | G10L 13/02 704/1 |
| 8,744,050 B2 | 6/2014 | Katis et al. | |
| 8,762,566 B2 | 6/2014 | Katis et al. | |
| 8,818,801 B2* | 8/2014 | Nagatomo | G10L 15/18 704/231 |
| 8,862,474 B2* | 10/2014 | Burke | G06F 3/0346 704/270 |
| 8,902,749 B2 | 12/2014 | Katis et al. | |
| 8,948,354 B2 | 2/2015 | Katis et al. | |
| 9,154,628 B2 | 10/2015 | Katis et al. | |
| 9,456,087 B2* | 9/2016 | Katis | H04L 12/1831 |
| 9,613,624 B1* | 4/2017 | Kramer | G10L 15/08 |
| 9,633,674 B2* | 4/2017 | Sinha | G10L 25/00 |
| 9,858,925 B2* | 1/2018 | Gruber | G10L 15/18 |
| 10,074,360 B2* | 9/2018 | Kim | G10L 15/01 |
| 10,102,359 B2* | 10/2018 | Cheyer | G06F 21/32 |
| 2005/0080619 A1* | 4/2005 | Choi | G01S 3/8006 704/215 |
| 2009/0248409 A1* | 10/2009 | Endo | H03G 3/32 704/226 |
| 2010/0057452 A1* | 3/2010 | Mukerjee | G10L 15/02 704/232 |
| 2011/0055256 A1* | 3/2011 | Phillips | G10L 15/30 707/769 |
| 2012/0035924 A1* | 2/2012 | Jitkoff | G01C 21/3608 704/235 |
| 2013/0197912 A1* | 8/2013 | Hayakawa | G10L 17/005 704/246 |
| 2014/0214418 A1* | 7/2014 | Nakadai | G10L 21/0216 704/233 |
| 2015/0149182 A1* | 5/2015 | Kalns | G10L 15/18 704/275 |
| 2017/0263255 A1* | 9/2017 | Jeong | G10L 15/183 |
| 2017/0263265 A1 | 9/2017 | Ashikawa et al. | |

FOREIGN PATENT DOCUMENTS

| | | |
|---|---|---|
| JP | 2010-534872 | 11/2010 |
| JP | 2010-282083 | 12/2010 |
| JP | 2010-534957 | 12/2010 |
| JP | 5381988 | 1/2014 |
| JP | 5387416 | 1/2014 |
| JP | 2014-195255 | 10/2014 |
| JP | 2016-042152 | 3/2016 |
| JP | 2017-161850 A | 9/2017 |

* cited by examiner

FIG.3

| ACQUISITION ORDER | SPEECH RECOGNITION DATA ||||| CLASSIFICATION DATA |
|---|---|---|---|---|---|
| | UTTERER ID | UTTERANCE START TIME | TEXT DATA | RECOGNITION STATE | CLASSIFICATION |
| 1 | USER-1 | 0:00:10 | TODAY'S | UNDEFINED | FIRST UTTERANCE |
| 2 | USER-1 | 0:00:10 | TODAY'S MEETING IS | UNDEFINED | FIRST UTTERANCE |
| 3 | USER-2 | 0:00:15 | YES | DEFINED | SECOND UTTERANCE |
| 4 | USER-1 | 0:00:10 | TODAY'S MEETING IS ABOUT REVISION OF | UNDEFINED | FIRST UTTERANCE |
| 5 | USER-3 | 0:00:20 | REVISION | DEFINED | SECOND UTTERANCE |
| 6 | USER-1 | 0:00:10 | TODAY'S MEETING IS ABOUT REVISION OF CLASS B | UNDEFINED | FIRST UTTERANCE |
| 7 | USER-2 | 0:00:30 | BEE | DEFINED | SECOND UTTERANCE |
| 8 | USER-1 | 0:00:10 | TODAY'S MEETING IS ABOUT REVISION OF CLASS B IN | UNDEFINED | FIRST UTTERANCE |
| 9 | USER-2 | 0:00:40 | WHERE EXACTLY | UNDEFINED | FIRST UTTERANCE |
| 10 | USER-1 | 0:00:10 | TODAY'S MEETING IS ABOUT REVISION OF CLASS B IN MODULE A | DEFINED | FIRST UTTERANCE |
| 11 | USER-2 | 0:00:40 | WHERE EXACTLY DO YOU MEAN? | DEFINED | FIRST UTTERANCE |

(PARTICIPANT A) TODAY'S ~201a

```
<div data-user-id="user-1" data-status="tmp-result" data-class="main" >
  <span class="sp">(PARTICIPANT A)</span>
  <span class="time">0:00:10</span>
  <span class="text">TODAY'S</span>
</div>
```
301a

```
                                                                    ,-301b
<div data-user-id="user-1" data-status="tmp-result" data-class="main" >
  <span class="sp">(PARTICIPANT A)</span>
  <span class="time">0:00:10</span>
  <span class="text">TODAY'S MEETING IS</span>
</div>
```

FIG.6A

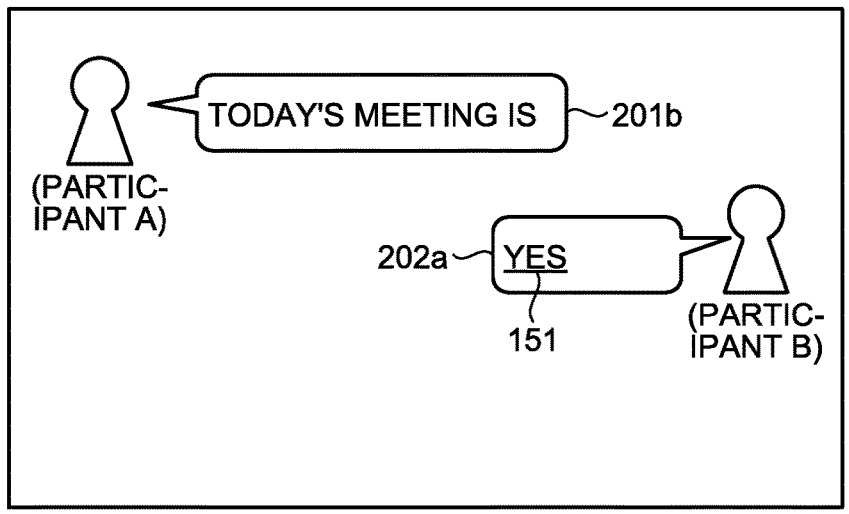

FIG.6B

```
<div data-user-id="user-1" data-status="tmp-result" data-class="main" >
  <span class="sp">(PARTICIPANT A)</span>
  <span class="time">0:00:10</span>
  <span class="text">TODAY'S MEETING IS</span>
</div>
```
—301b

```
<div data-user-id="user-2" data-status="tmp-result" data-class="sub" >
  <span class="sp">(PARTICIPANT B)</span>
  <span class="time">0:00:15</span>
  <span class="text">YES</span>
</div>
```
—302a

FIG.7A

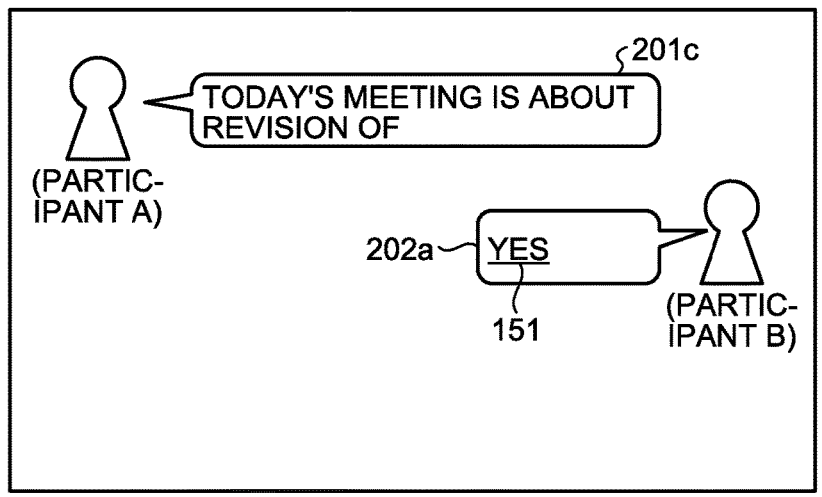

FIG.7B

```
<div data-user-id="user-1" data-status="tmp-result" data-class="main" >
  <span class="sp">(PARTICIPANT A)</span>
  <span class="time">0:00:10</span>
  <span class="text">TODAY'S MEETING IS ABOUT REVISION OF</span>
</div>
```
301c

```
<div data-user-id="user-2" data-status="tmp-result" data-class="sub" >
  <span class="sp">(PARTICIPANT B)</span>
  <span class="time">0:00:15</span>
  <span class="text">YES</span>
</div>
```
302a

FIG.8A

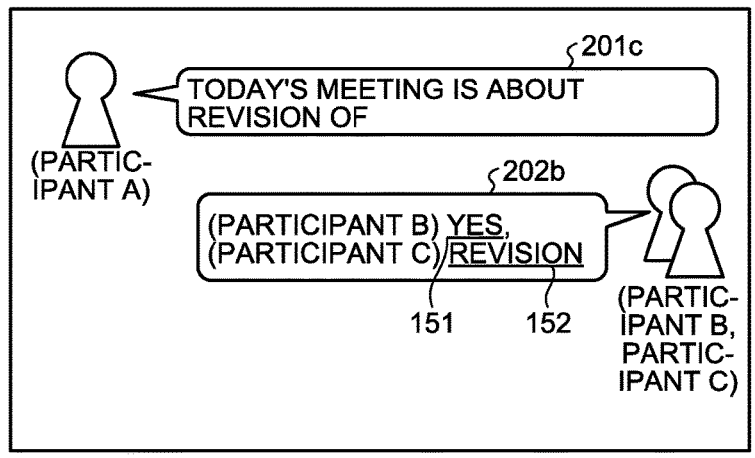

FIG.8B

```
<div data-user-id="user-1" data-status="tmp-result" data-class="main" >
  <span class="sp">(PARTICIPANT A)</span>
  <span class="time">0:00:10</span>
  <span class="text">TODAY'S MEETING IS ABOUT REVISION OF</span>
</div>
```
⸺301c

```
<div data-user-id="user-2" data-status="tmp-result" data-class="sub" >
  <span class="sp">(PARTICIPANT B), (PARTICIPANT C)</span>
  <span class="time">0:00:15, 0:00:20</span>
  <span class="text">(PARTICIPANT B) YES, (PARTICIPANT C) REVISION</span>
</div>
```
⸺302b

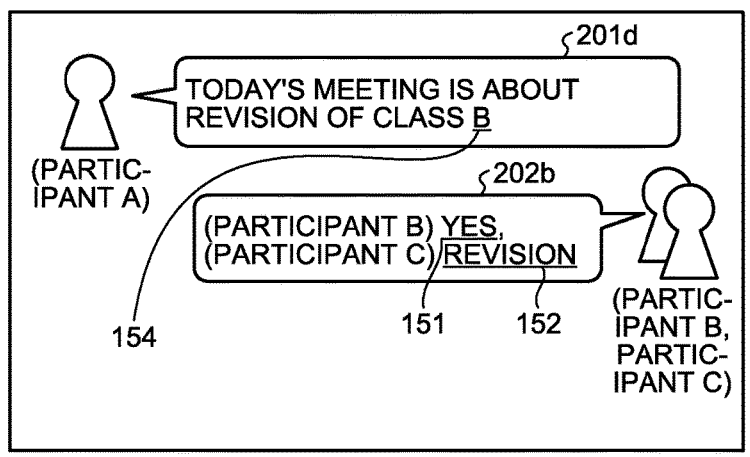

FIG.10A

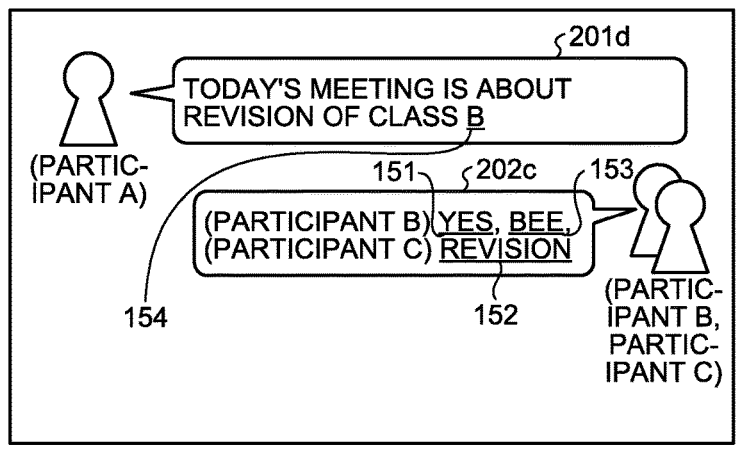

FIG.10B

```
<div data-user-id="user-1" data-status="tmp-result" data-class="main" >
  <span class="sp">(PARTICIPANT A)</span>
  <span class="time">0:00:10</span>
  <span class="text">TODAY'S MEETING IS ABOUT REVISION OF CLASS B</span>
</div>
```
301d

```
<div data-user-id="user-2" data-status="tmp-result" data-class="sub" >
  <span class="sp">(PARTICIPANT B), (PARTICIPANT C)</span>
  <span class="time">0:00:15, 0:00:20</span>
  <span class="text">(PARTICIPANT B) YES, BEE, (PARTICIPANT C) REVISION</span>
</div>
```
302c

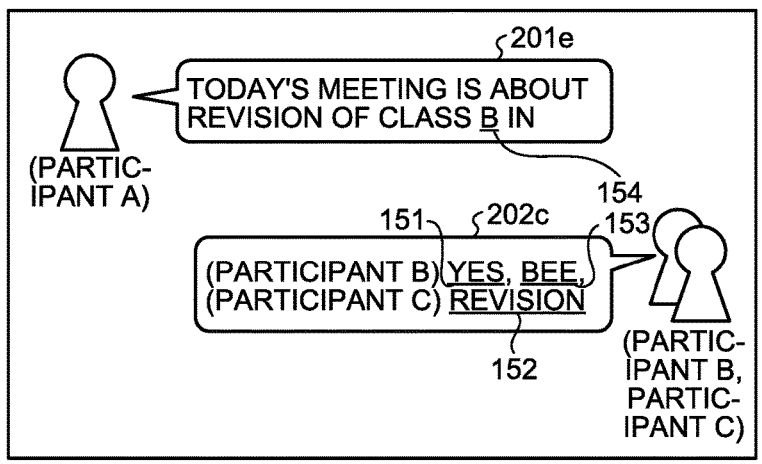

FIG.12A

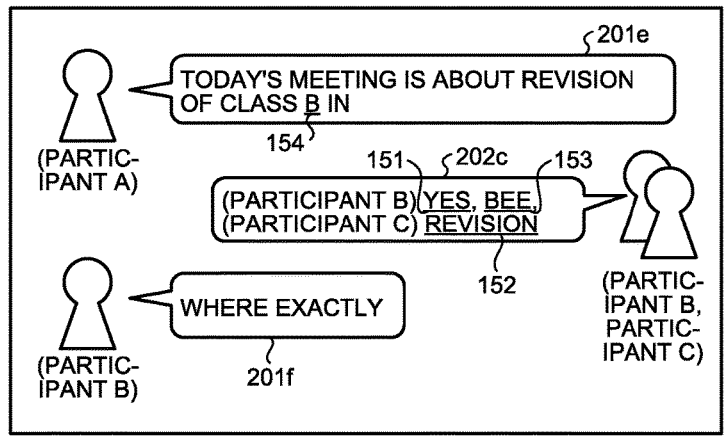

FIG.12B

```
<div data-user-id="user-1" data-status="tmp-result" data-class="main" >
  <span class="sp">(PARTICIPANT A)</span>
  <span class="time">0:00:10</span>
  <span class="text">TODAY'S MEETING IS ABOUT REVISION OF CLASS B IN</span>
</div>

<div data-user-id="user-2" data-status="result" data-class="sub" >
  <span class="sp">(PARTICIPANT B), (PARTICIPANT C)</span>
  <span class="time">0:00:15, 0:00:20</span>
  <span class="text">(PARTICIPANT B) YES, BEE, (PARTICIPANT C) REVISION</span>
</div>

<div data-user-id="user-1" data-status="tmp-result" data-class="main" >
  <span class="sp">(PARTICIPANT B)</span>
  <span class="time">0:00:10</span>
  <span class="text">WHERE EXACTLY</span>
</div>
```

CONFERENCE SUPPORT SYSTEM, CONFERENCE SUPPORT METHOD, AND COMPUTER PROGRAM PRODUCT

CROSS-REFERENCE TO RELATED APPLICATION

This application is based upon and claims the benefit of priority from Japanese Patent Application No. 2016-182175, filed on Sep. 16, 2016; the entire contents of which are incorporated herein by reference.

FIELD

Embodiments of the present invention relate to a conference support system, a conference support method, and a computer program.

BACKGROUND

A conference support system configured such that utterances of participants participated in a conference are converted into character strings in real time by utilizing speech recognition technology has been conventionally known. Character strings obtained by speech recognition technology are displayed, for example, in chronological order of a start time of each utterance or an acquisition time of speech recognition data.

With the conventional technology, however, display data including character strings obtained from speech recognition data in a conference where a plurality of persons are participated is sometimes difficult to view.

BRIEF DESCRIPTION OF THE DRAWINGS

FIG. 3 is a diagram illustrating examples of speech recognition data and classification data according to the first embodiment;

FIG. 6A is a diagram illustrating Example 3 of display data according to the first embodiment;

FIG. 6B is a diagram illustrating an example of HTML tags representing the display data in FIG. 6A;

FIG. 7A is a diagram illustrating Example 4 of display data according to the first embodiment;

FIG. 7B is a diagram illustrating an example of HTML tags representing the display data in FIG. 7A;

FIG. 8A is a diagram illustrating Example 5 of display data according to the first embodiment;

FIG. 8B is a diagram illustrating an example of HTML tags representing the display data in FIG. 8A;

FIG. 9A is a diagram illustrating Example 6 of display data according to the first embodiment;

FIG. 9B is a diagram illustrating an example of HTML tags representing the display data in FIG. 9A;

FIG. 10A is a diagram illustrating Example 7 of display data according to the first embodiment;

FIG. 10B is a diagram illustrating an example of HTML tags representing the display data in FIG. 10A;

FIG. 11A is a diagram illustrating Example 8 of display data according to the first embodiment;

FIG. 11B is a diagram illustrating an example of HTML tags representing the display data in FIG. 11A;

FIG. 12A is a diagram illustrating Example 9 of display data according to the first embodiment;

FIG. 12B is a diagram illustrating an example of HTML tag representing the display data in FIG. 12A;

DETAILED DESCRIPTION

According to an embodiment, a conference support system includes a recognizer, a classifier, a first caption controller, a second caption controller, and a display controller. The recognizer, implemented in computer hardware, is configured to recognize text data corresponding speech from a speech section and configured to distinguish between the speech section and a non-speech section included in speech data. The classifier, implemented in computer hardware, is configured to classify the text data into first utterance data representing a principal utterance and second utterance data representing an utterance other than the principal utterance. The first caption controller, implemented in computer hardware, is configured to generate first caption data for displaying the first utterance data without waiting for identification of a first speech section corresponding to the first utterance data to finish. The second caption controller, implemented in computer hardware, is configured to generate second caption data for displaying the second utterance data after identification of a second speech section corresponding to the second utterance data finishes. The display controller is configured to control a display of the first caption data and the second caption data.

Referring to the accompanying drawings, a conference support system, a conference support method, and a computer program product according to embodiments are described in detail below.

First Embodiment

First, an example of a device configuration of a conference support system according to a first embodiment is described.

Device Configuration of Conference Support System

Figure 1:
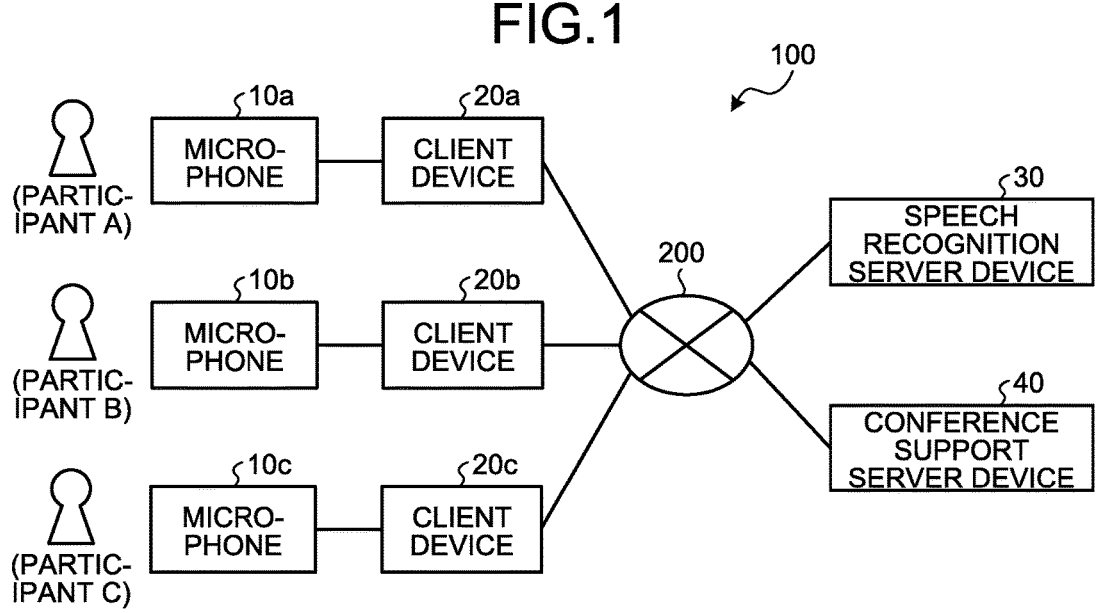
FIG. 1 is a diagram illustrating an example of a device configuration of a conference support system according to a first embodiment.

FIG. 1 is a diagram illustrating an example of a device configuration of a conference support system 100 according to the first embodiment. The conference support system 100 according to the first embodiment includes microphones 10a to 10c, client devices 20a to 20c, a speech recognition server device 30, and a conference support server device 40.

The client devices 20a to 20c, the speech recognition server device 30, and the conference support server device 40 are connected to one another via a network 200. The network 200 may employ either a wired communication method or a wireless communication method. The network 200 may be implemented by a combination of the wired communication method and the wireless communication method.

The microphone 10a acquires speech data including a voice of a participant A in a conference, and inputs the speech data to the client device 20a. Similarly, the microphone 10b acquires speech data including a voice of a participant B in the conference, and inputs the speech data to the client device 20b. Similarly, the microphone 10c acquires speech data including a voice of a participant C in the conference, and inputs the speech data to the client device 20c.

Each of the microphones 10a to 10c is, for example, a pin microphone worn by each utterer. The microphones 10a to 10c convert sound signals (analog signals) into speech data (digital signals).

The client device 20a receives the speech data from the microphone 10a, and transmits the speech data to the speech recognition server device 30 via the network 200. Similarly, the client device 20b receives the speech data from the microphone 10b, and transmits the speech data to the speech recognition server device 30 via the network 200. Similarly, the client device 20c receives the speech data from the microphone 10c, and transmits the speech data to the speech recognition server device 30 via the network 200.

In the following, the microphones 10a to 10c are referred to simply as "microphone 10" unless otherwise distinguished. Similarly, the client devices 20a to 20c are referred to simply as "client device 20" unless otherwise distinguished.

The speech recognition server device 30 receives the speech data from the client device 20 via the network 200, and subjects the speech data to speech recognition. In this manner, the speech recognition server device 30 acquires speech recognition data including text data corresponding to the voice included in the speech data. The speech recognition server device 30 transmits the speech recognition data to the conference support server device 40 via the network 200.

The conference support server device 40 receives the speech recognition data from the speech recognition server device 30 via the network 200, and generates display data from the speech recognition data. For example, the display data is generated by using HyperText Markup Language (HTML) tags. Details of the display data are described later. The conference support server device 40 transmits the display data to the client devices 20a to 20c via the network 200.

The client devices 20a to 20c receive the display data from the conference support server device 40 via the network 200, and display the display data. For example, the client devices 20a to 20c display the display data by using web browsers.

The case where the number of participants in the conference is three is described with reference to the example in FIG. 1. However, the number of participants in the conference is not limited to three and can be freely set.

The above-mentioned device configuration of the conference support system 100 is illustrative. The device configuration of the conference support system 100 can be changed as appropriate. For example, the speech recognition server device 30 and the conference support server device 40 may be integrated into a single server device. For another example, the client device 20, the speech recognition server device 30, and the conference support server device 40 may be integrated into a single device.

Next, an example of a functional configuration of the conference support system 100 according to the first embodiment is described.

Functional Configuration of Conference Support System

Figure 2:
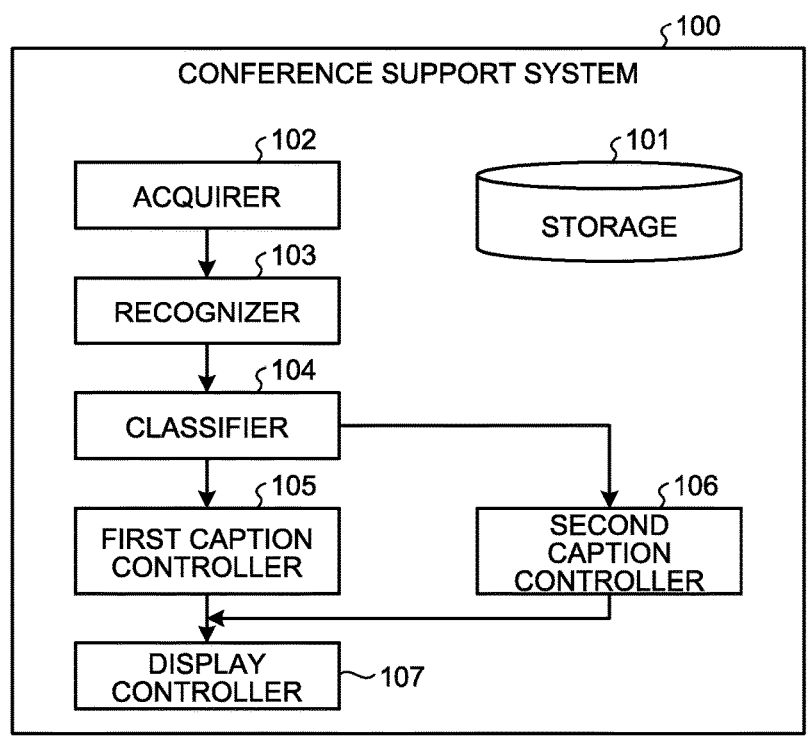
FIG. 2 is a diagram illustrating an example of a functional configuration of the conference support system according to the first embodiment.

FIG. 2 is a diagram illustrating an example of the functional configuration of the conference support system 100 according to the first embodiment. The conference support system 100 according to the first embodiment includes a storage 101, an acquirer 102, a recognizer 103, a classifier 104, a first caption controller 105, a second caption controller 106, and a display controller 107.

The storage 101 stores data therein. For example, the storage 101 is implemented by main storage devices and auxiliary storage devices of the client device 20, the speech recognition server device 30, and the conference support server device 40. Examples of data stored in the storage 101 include speech data, speech recognition data, classification data, caption data, and display data. Details of each data stored in the storage 101 are described later.

The acquirer 102 acquires the above-mentioned speech data, and inputs the speech data to the recognizer 103. For example, the acquirer 102 is implemented by the above-mentioned microphones 10a to 10c.

The recognizer 103 acquires the speech data from the acquirer 102, and subjects the speech data to speech recognition, thereby acquiring the above-mentioned speech recognition data. For example, the recognizer 103 is implemented by the above-mentioned speech recognition server device 30. The recognizer 103 inputs the speech data and the speech recognition data to the classifier 104.

The classifier 104 receives the speech data and the speech recognition data from the recognizer 103. The classifier 104 uses at least one of the speech data or the speech recognition data to classify text data into a first utterance and a second utterance. Examples of a classification method by the classifier 104 are described later. For example, the classifier 104 is implemented by the above-mentioned speech recognition server device 30.

The first utterance (main utterance) is a principal utterance that is not back-channel feedback or a repeated utterance among utterances in a conference.

The second utterance (sub utterance) indicates an utterance that is not principal in a conference. For example, the second utterance is back-channel feedback, such as "yeah", "yes", and "I see".

For another example, the second utterance is an utterance that repeats a word included in the first utterance. For example, the utterance that repeats a word included in the first utterance is an utterance that repeats the same word by a listener in order to confirm the content of the first utterance. For another example, the utterance that repeats a word included in the first utterance is a word having the same sound as a word in a voice uttered by an utterer of the first utterance, which is obtained when the voice is input to the microphone 10 worn by another utterer (see, for example, text data 153 in FIG. 3 referred to later).

In the following, text data classified into the first utterance is referred to as "first utterance data". An utterer of the first utterance is referred to as "first utterer". The number of the first utterers may be plural. Similarly, text data classified into the second utterance is referred to as "second utterance data". An utterer of the second utterance is referred to as "second utterer". The number of the second utterers may be plural.

An example of the speech recognition data and an example of the classification data are now described.

Examples of Speech Recognition Data and Classification Data

FIG. 3 is a diagram illustrating examples of the speech recognition data and the classification data according to the first embodiment. The speech recognition data according to the first embodiment includes an acquisition order, an utterer ID, an utterance start time, text data, and a recognition state. The classification data according to the first embodiment includes classification (first utterance or second utterance).

The acquisition order represents the order in which speech recognition data is acquired.

The utterer ID is identification information identifying an utterer. USER-1 is an utterer ID identifying a participant A. USER-2 is an utterer ID identifying a participant B. USER-3 is an utterer ID identifying a participant C.

The utterance start time is the time at which an utterance starts. For example, the utterance start time 0:00:00 represents the start time of a conference. In the example in FIG. 3, for example, the utterance start time of text data of USER-2 whose acquisition order is 11 is 0:00:40 (40 seconds after the start of the conference).

The text data is a character string obtained by subjecting an uttered voice to speech recognition.

The recognition state represents the state of text data (defined or undefined). The recognition state of text data is now described. In the case of successively subjecting voices to speech recognition (successive speech recognition) under a real environment such as a conference, the recognizer 103 first identifies a speech section and a non-speech section by using speech activity detection technology for identifying a speech section and a non-speech section. The speech section is a section in which a speech is uttered. The non-speech section is a section in which no speech is uttered. When the recognizer 103 starts to identify a speech section, the recognizer 103 sequentially performs speech recognition until the identification of the speech section is finished.

Text data in the undefined state is text data obtained before the identification of a speech section for the text data is finished. Text data in the defined state is text data corresponding to a speech from the start of identification of one speech section for the text data to the finish of the identification of the speech section.

In the example in FIG. 3, for example, the recognition state of text data of USER-2 whose acquisition order is 9 is "undefined", and the recognition state of text data of USER-2 whose acquisition order is 11 is "defined".

The classification data represents classification of text data. For example, the classification of text data of USER-1 whose acquisition order is 2 is a first utterance. In other words, the text data of USER-1 whose acquisition order is 2 is first utterance data.

The classification of text data 151 of USER-2 whose acquisition order is 3 is a second utterance. In other words, the text data 151 of USER-2 whose acquisition order is 3 is second utterance data. The text data 151 is an example of back-channel feedback.

Text data 152 is an example of second utterance data that is obtained by speech recognition on an utterance that repeats the same word by a listener in order to confirm the content of the first utterance.

Text data 153 indicates an example where a part 154 of text data uttered by USER-1 (participant A) is loudly pronounced and thus input to the microphone 10b of USER-2 (participant B). The text data 153 and the part 154 of the text data are different in notation. The reason is that the recognizer 103 obtains the text data 153 as an optimal conversion result from the pronunciation of the part 154 of the text data.

Details of a method of classifying text data into a first utterance and a second utterance are described later with reference to flowcharts (see FIG. 16 and FIG. 17).

Returning to FIG. 2, the classifier 104 inputs speech recognition data including first utterance data to the first caption controller 105. The classifier 104 inputs speech recognition data including second utterance data to the second caption controller 106.

The first caption controller 105 receives the speech recognition data including the first utterance data from the classifier 104, and performs caption control processing based on the first utterance data to generate (update) first caption data. For example, the first caption controller 105 is implemented by the above-mentioned conference support server device 40.

The second caption controller 106 receives the speech recognition data including the second utterance data from the classifier 104, and performs caption control processing based on the second utterance data to generate (update) second caption data. For example, the second caption controller 106 is implemented by the above-mentioned conference support server device 40.

The display controller 107 performs display control processing for displaying the first caption data and the second caption data. For example, the display controller 107 is implemented by the above-mentioned client device 20.

An example of display data obtained by caption control processing and display control processing by using the speech recognition data and the classification data exemplified in FIG. 3 and an example of HTML tags representing the display data are now described. Details of the control processing and the display control processing are described later with reference to flowcharts (see FIG. 18 and FIG. 19).

Examples of Display Data and HTML Tag

Figures 4A, 4B:
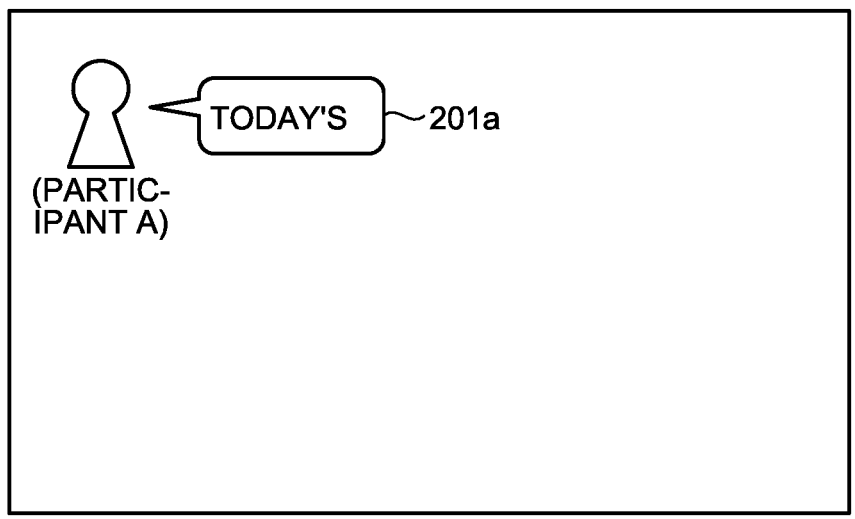
FIG. 4A is a diagram illustrating Example 1 of display data according to the first embodiment.
FIG. 4B is a diagram illustrating an example of HTML tags representing the display data in FIG. 4A.

FIG. 4A is a diagram illustrating Example 1 of display data according to the first embodiment. FIG. 4B is a diagram illustrating an example of HTML tags representing the display data in FIG. 4A.

The first caption controller 105 generates first caption data 201a from the speech recognition data whose acquisition order is 1 exemplified in FIG. 3. Specifically, the first caption controller 105 generates HTML tags 301a representing the first caption data 201a because the recognition state of text data (first utterance data) included in the speech recognition data whose acquisition order is 1 is "undefined"

and there is no first caption data for displaying the first utterance data of USER-1 (participant A).

Figures 5A, 5B:
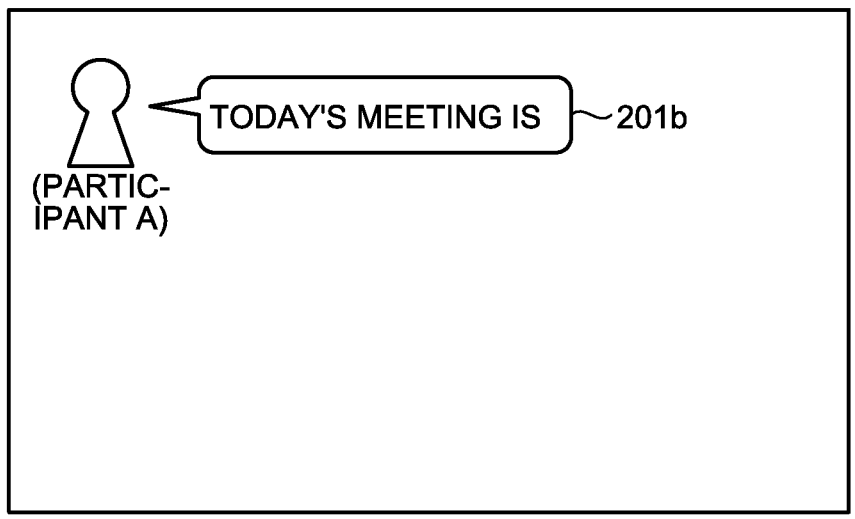
FIG. 5A is a diagram illustrating Example 2 of display data according to the first embodiment.
FIG. 5B is a diagram illustrating an example of HTML tags representing the display data in FIG. 5A.

FIG. 5A is a diagram illustrating Example 2 of display data according to the first embodiment. FIG. 5B is a diagram illustrating an example of HTML tags representing the display data in FIG. 5A.

The first caption controller 105 updates the first caption data 201a to first caption data 201b by using the speech recognition data whose acquisition order is 2 exemplified in FIG. 3. Specifically, the first caption controller 105 updates the HTML tags 301a in FIG. 4B to HTML tags 301b in FIG. 5B because the recognition state of text data (first utterance data) included in the speech recognition data whose acquisition order is 2 is "undefined" and the first caption data 201a for displaying the first utterance data of USER-1 (participant A) is present.

FIG. 6A is a diagram illustrating Example 3 of display data according to the first embodiment. FIG. 6B is a diagram illustrating HTML tags representing the display data in FIG. 6A.

The second caption controller 106 generates second caption data 202a from the speech recognition data whose acquisition order is 3 exemplified in FIG. 3. Specifically, the second caption controller 106 generates HTML tags 302a because the recognition state of text data 151 (second utterance data) included in the speech recognition data whose acquisition order is 3 is "defined" and there is no second caption data for displaying the second utterance data.

As illustrated in FIG. 6A and FIG. 6B, the display format (first display format) of the first utterance data and the display format (second display format) of the second utterance data are different. In the example in FIG. 6A, first utterance data representing a principal utterance among utterances in the conference are displayed on the left side, and second utterance data representing back-channel feedback or repetition is displayed on the right side. This configuration enables the display data to be easy to view.

FIG. 7A is a diagram illustrating Example 4 of display data according to the first embodiment. FIG. 7B is a diagram illustrating an example of HTML tags representing the display data in FIG. 7A.

The first caption controller 105 uses the speech recognition data whose acquisition order is 4 exemplified in FIG. 3 to update the first caption data 201b to first caption data 201c. Specifically, the first caption controller 105 updates the HTML tag 301b in FIG. 6B to HTML tags 301c in FIG. 7B because the recognition state of text data (first utterance data) included in the speech recognition data whose acquisition order is 4 is "undefined" and the first caption data 201b for displaying the first utterance data of USER-1 (participant A) is present.

FIG. 8A is a diagram illustrating Example 5 of display data according to the first embodiment. FIG. 8B is a diagram illustrating an example of HTML tags representing the display data in FIG. 8A.

The second caption controller 106 uses the speech recognition data whose acquisition order is 5 exemplified in FIG. 3 to update the second caption data 202a to second caption data 202b. Specifically, the second caption controller 106 updates the HTML tags 302a in FIG. 7B to an HTML tags 302b in FIG. 8B because the recognition state of text data 152 (second utterance data) included in the speech recognition data whose acquisition order is 5 is "defined" and the second caption data 202a is present.

FIG. 9A is a diagram illustrating Example 6 of display data according to the first embodiment. FIG. 9B is a diagram illustrating an example of HTML tags representing the display data in FIG. 9A.

The first caption controller 105 uses the speech recognition data whose acquisition order is 6 exemplified in FIG. 3 to update the first caption data 201c to first caption data 201d. Specifically, the first caption controller 105 updates the HTML tags 301c in FIG. 8B to HTML tags 301d in FIG. 9B because the recognition state of text data (first utterance data) included in the speech recognition data whose acquisition order is 6 is "undefined" and the first caption data 201c for displaying the first utterance data of USER-1 (participant A) is present.

FIG. 10A is a diagram illustrating Example 7 of display data according to the first embodiment. FIG. 10B is a diagram illustrating an example of HTML tags representing the display data in FIG. 10A.

The second caption controller 106 uses the speech recognition data whose acquisition order is 7 exemplified in FIG. 3 to update the second caption data 202b to second caption data 202c. Specifically, the second caption controller 106 updates the HTML tags 302b in FIG. 9B to an HTML tags 302c in FIG. 10B because the recognition state of text data 153 (second utterance data) included in the speech recognition data whose acquisition order is 7 is "defined" and the second caption data 202b is present.

As illustrated in FIG. 10A, the above-mentioned text data 151 to 153 are displayed collectively as the second caption data 202c. This configuration enables display data including the first caption data 201d representing the text data whose acquisition order is 6 and the text data 151 to 153 that are not principal utterances in the conference to be easy to view.

FIG. 11A is a diagram illustrating Example 8 of display data according to the first embodiment. FIG. 11B is a diagram illustrating an example of HTML tags representing the display data in FIG. 11A.

The first caption controller 105 uses the speech recognition data whose acquisition order is 8 exemplified in FIG. 3 to update the first caption data 201d to first caption data 201e. Specifically, the first caption controller 105 updates the HTML tags 301d in FIG. 10B to HTML tags 301e in FIG. 11B because the recognition state of text data (first utterance data) included in the speech recognition data whose acquisition order is 8 is "undefined" and the first caption data 201d for displaying the first utterance data of USER-1 (participant A) is present.

FIG. 12A is a diagram illustrating Example 9 of display data according to the first embodiment. FIG. 12B is a diagram illustrating an example of HTML tags representing the display data in FIG. 12A.

The first caption controller 105 uses the speech recognition data whose acquisition order is 9 exemplified in FIG. 3 to generate first caption data 201f. Specifically, the first caption controller 105 generates HTML tags 301f representing the first caption data 201f because the recognition state of text data (first utterance data) included in the speech recognition data whose acquisition order is 9 is "undefined" and there is no first caption data for displaying the first utterance data of USER-2 (participant B).

As illustrated in FIG. 12A, the first utterance data is displayed for each utterer. The second utterance data is not displayed for each utterer (displayed collectively).

Figure 13A:
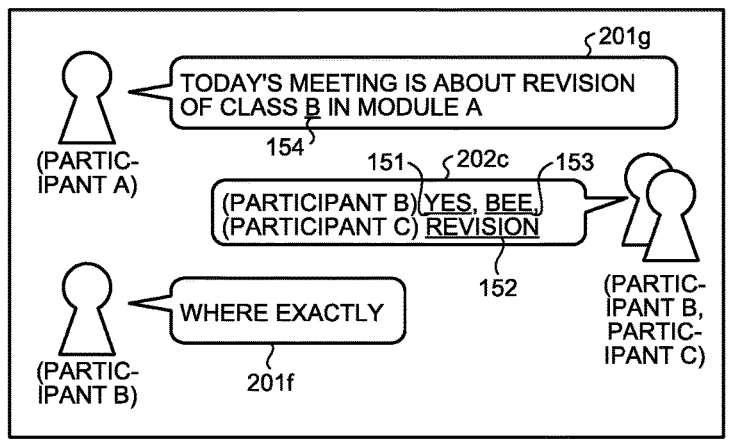
FIG. 13A is a diagram illustrating Example 10 of display data according to the first embodiment.
Figure 13B:
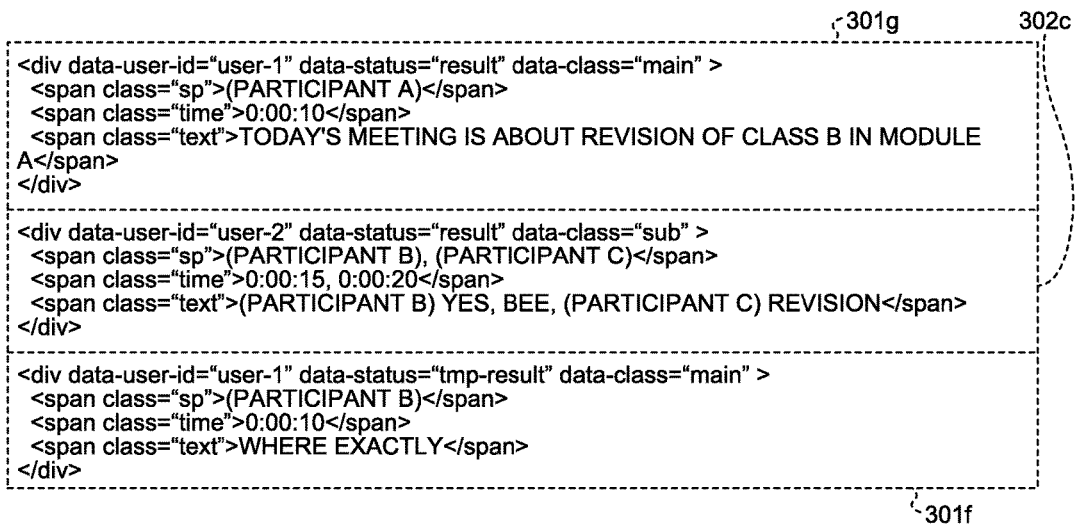
FIG. 13B is a diagram illustrating an example of HTML tags representing the display data in FIG. 13A.

FIG. 13A is a diagram illustrating Example 10 of display data according to the first embodiment. FIG. 13B is a diagram illustrating an example of HTML tags representing the display data in FIG. 13A.

The first caption controller 105 uses the speech recognition data whose acquisition order is 10 exemplified in FIG. 3 to update the first caption data 201e to first caption data 201g. Specifically, the first caption controller 105 updates the HTML tags 301e in FIG. 12B to an HTML tags 301g in FIG. 13B because the recognition state of text data (first utterance data) included in the speech recognition data whose acquisition order is 10 is "defined" and the first caption data 201g for displaying the first utterance data of USER-1 (participant A).

Figure 14A:
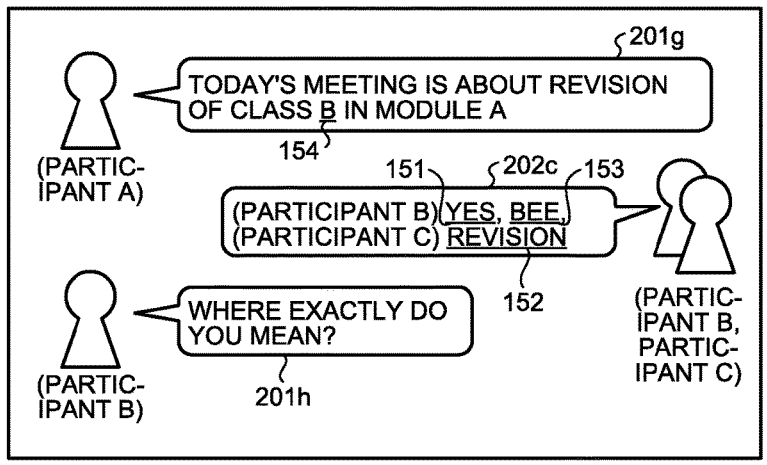
FIG. 14A is a diagram illustrating Example 11 of display data according to the first embodiment.
Figure 14B:
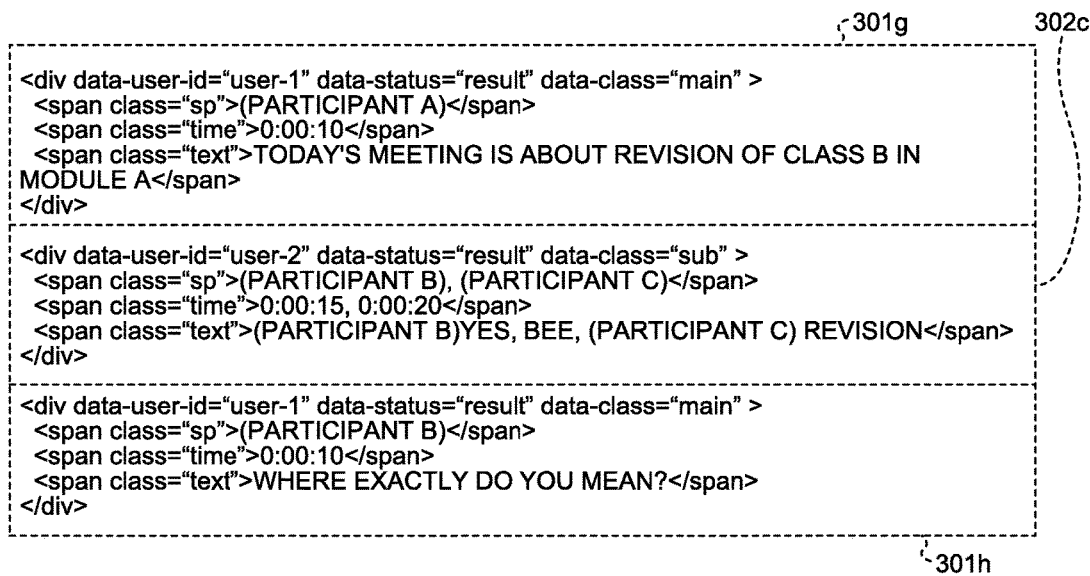
FIG. 14B is a diagram illustrating an example of HTML tags representing the display data in FIG. 14A.

FIG. 14A is a diagram illustrating Example 11 of display data according to the first embodiment. FIG. 14B is a diagram illustrating an example of HTML tags representing the display data in FIG. 14A.

The first caption controller 105 uses the speech recognition data whose acquisition order is 11 exemplified in FIG. 3 to update the first caption data 201f to first caption data 201h. Specifically, the first caption controller 105 updates the HTML tags 301f in FIG. 13B to HTML tags 301h in FIG. 14B because the recognition state of text data (first utterance data) included in the speech recognition data whose acquisition order is 11 is "defined" and the first caption data 201f for displaying the first utterance data of USER-2 (participant B) is present.

With the caption control processing and the display control processing in FIG. 4A to FIG. 14B, the display controller 107 can display first utterance data as first caption data in real time. The display controller 107 can display second utterance data of different utterers whose recognition states are defined as second caption data collectively.

In this manner, the screen of the client device 20 on which the display data is displayed can be effectively used. For example, it is possible to prevent a principal utterance (first caption data) in the conference from flowing out of the screen (from disappearing from the screen) in a short period of time due to the update of display data for displaying a non-principal utterance (second caption data).

Conference Support Method

Next, details of a conference support method according to the first embodiment are described with reference to flowcharts.

Figure 15:
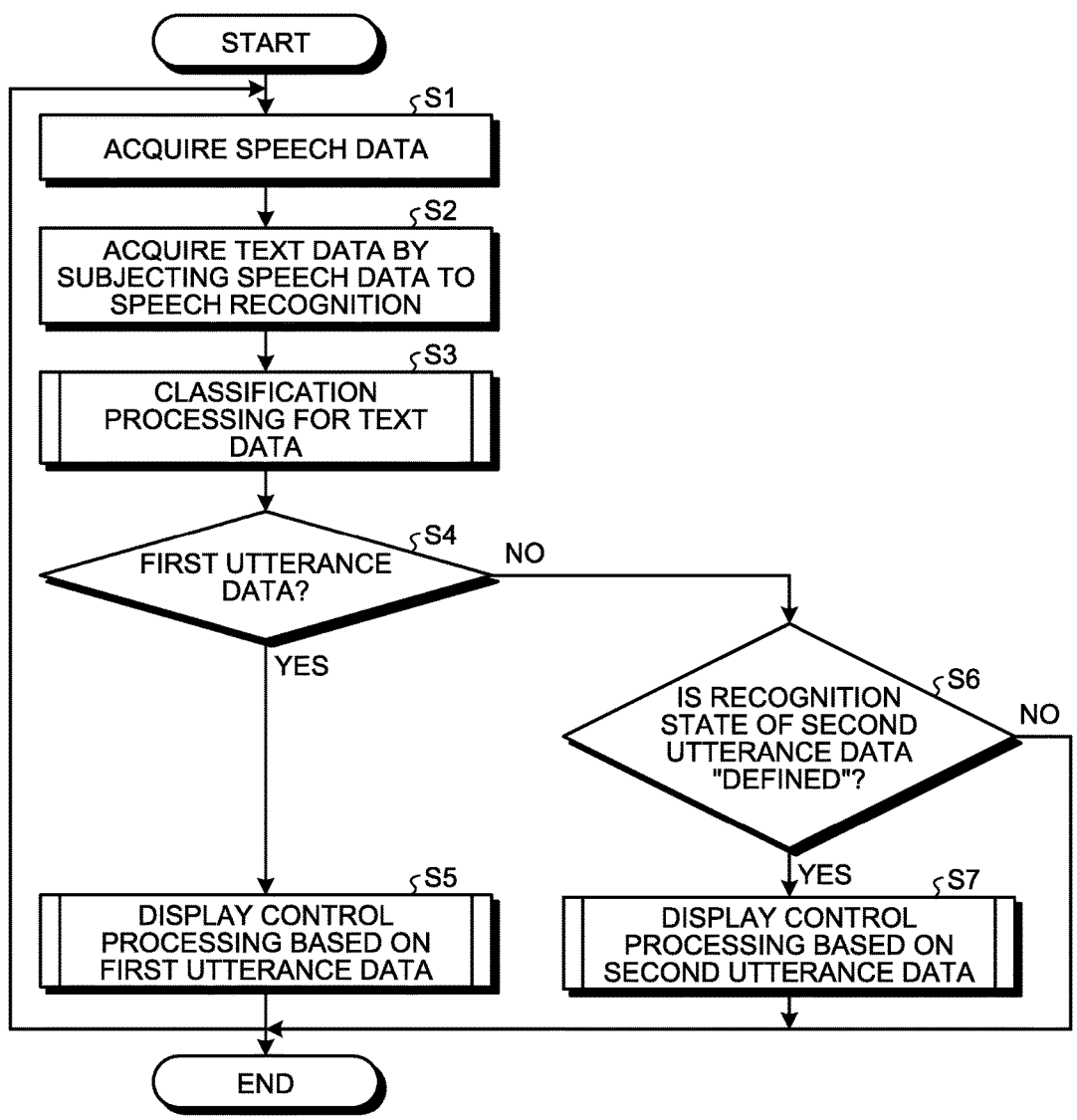
FIG. 15 is a flowchart illustrating an example of a conference support method according to the first embodiment.

FIG. 15 is a flowchart illustrating an example of the conference support method according to the first embodiment. First, the acquirer 102 acquires the above-mentioned speech data (Step S1). Next, the recognizer 103 subjects the speech data acquired by the processing at Step S1 to speech recognition, thereby acquiring the above-mentioned text data (Step S2).

Next, the classifier 104 performs classification processing for classifying the text data acquired by the processing at Step S2 into a first utterance and a second utterance (Step S3). Details of the classification processing are described later with reference to FIG. 16 and FIG. 17.

When the text data is first utterance data (Yes at Step S4), the first caption controller 105 and the display controller 107 perform display control processing based on the first utterance data (Step S5). Details of the display control processing based on the first utterance data are described later with reference to FIG. 18.

When the text data is not first utterance data (No at Step S4), that is, when the text data is second utterance data, the second caption controller 106 determines whether the recognition state of the second utterance data is "defined" (Step S6).

When the recognition state of the second utterance data is not "defined" (No at Step S6), the processing is finished.

When the recognition state of the second utterance data is "defined" (Yes at Step S6), the second caption controller 106 and the display controller 107 perform display control processing based on the second utterance data. Details of the display control processing based on the second utterance data are described later with reference to FIG. 19.

Example 1 Of Classification Method

Figure 16:
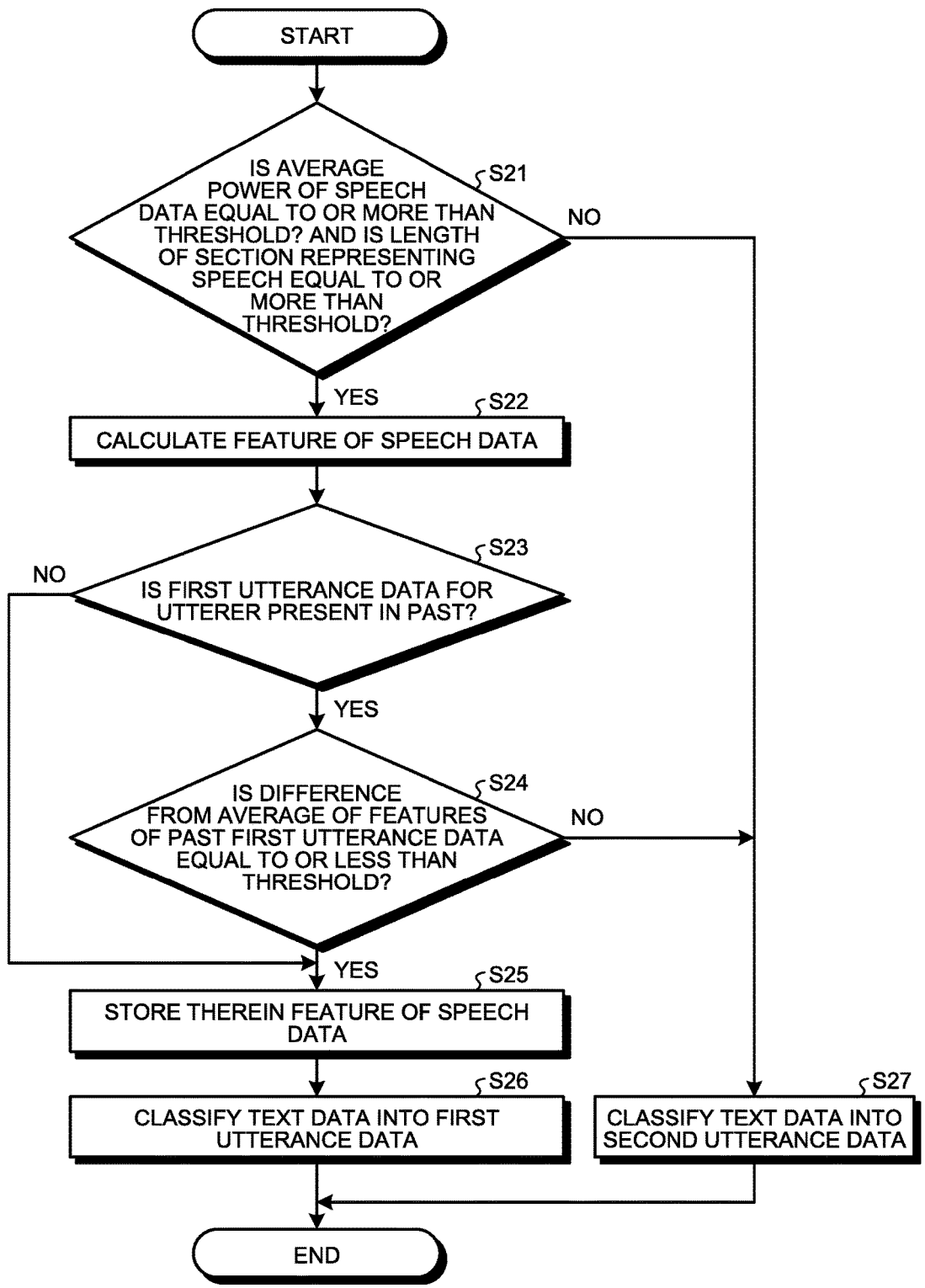
FIG. 16 is a flowchart illustrating Example 1 of a classification method according to the first embodiment.

FIG. 16 is a flowchart illustrating Example 1 of the classification method according to the first embodiment. The flowchart in FIG. 16 illustrates the case where the above-mentioned speech data is used to classify the above-mentioned text data.

First, the classifier 104 determines whether an average power of the speech data is equal to or more than a threshold (first threshold) and the length of a speech section (first speech section) in the speech data corresponding to the text data is equal to or more than a threshold (second threshold) (Step S21). The average power of the speech data is an average power of a signal that includes the speech data.

When the average power of the speech data is not equal to or more than the threshold or when the length of the speech section in the speech data corresponding to the text data is not equal to or more than the threshold (No at Step S21), the classifier 104 classifies the text data into second utterance data (Step S27).

When the average power of the speech data is equal to or more than the threshold and when the length of the speech section in the speech data corresponding to the text data is equal to or more than the threshold (Yes at Step S21), the classifier 104 calculates a feature of the speech data (Step S22). The feature is information identifying an utterer. For example, the feature is an average power in a particular frequency bandwidth obtained by subjecting the speech data to frequency analysis. Any feature used for general utterer identification processing can be used.

Next, the classifier 104 determines whether first utterance data for the utterer is present in the past (Step S23).

When there is no first utterance data for the utterer in the past (No at Step S23), the classifier 104 stores therein the feature of the speech data calculated by the processing at Step S22 (Step S25). The classifier 104 classifies the text data into first utterance data (Step S26).

When there is first utterance data for the utterer in the past (Yes at Step S23), the classifier 104 determines whether a difference between the feature calculated at Step S22 and an average of features of the speech data corresponding to the past first utterance data is equal to or less than a threshold (third threshold) (Step S24).

When the difference from the average of the features of the past first utterance data is equal to or less than the threshold (Yes at Step S24), the classifier 104 stores therein the feature of the speech data calculated by the processing at Step S22 (Step S25). The classifier 104 classifies the text data into first utterance data (Step S26).

When the difference from the average of the features of the past first utterance data is not equal to or less than the threshold (No at Step S24), the classifier 104 classifies the text data into second utterance data (Step S27).

Example 2 Of Classification Method

Figure 17:
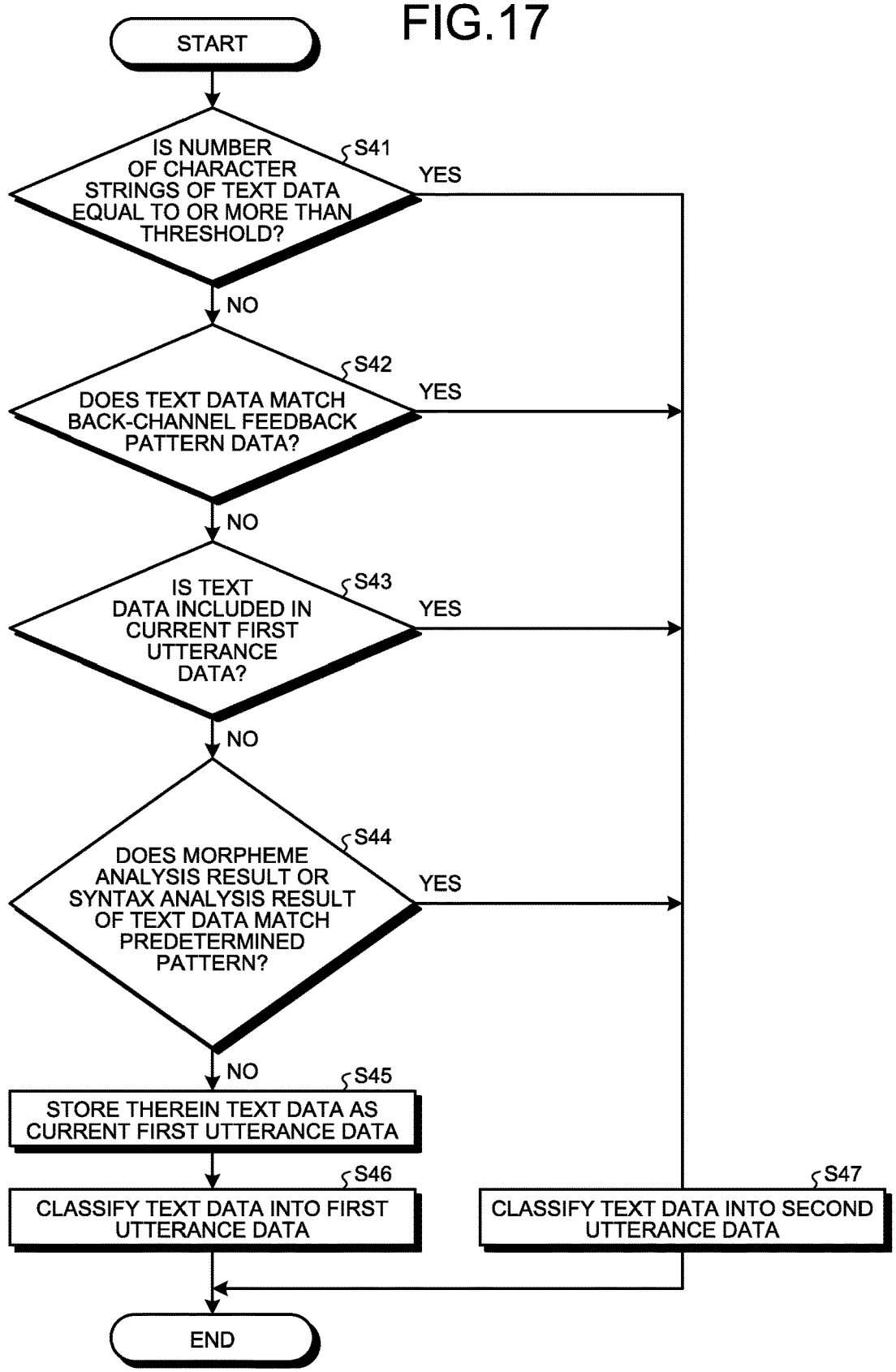
FIG. 17 is a flowchart illustrating Example 2 of the classification method according to the first embodiment.

FIG. 17 is a flowchart illustrating Example 2 of the classification method according to the first embodiment. The flowchart in FIG. 17 illustrates the case where the above-mentioned speech recognition data is used to classify the above-mentioned text data.

First, the classifier 104 determines whether the number of characters included in the text data is equal to or less than a threshold (fourth threshold) (Step S41).

When the number of characters included in the text data is equal to or less than the threshold (Yes at Step S41), the classifier 104 classifies the text data into second utterance data (Step S47).

When the number of characters included in the text data is not equal to or less than the threshold (No at Step S41), the classifier 104 determines whether the text data matches back-channel feedback pattern data representing predetermined back-channel feedback (Step S42).

The back-channel feedback pattern data is data representing predetermined back-channel feedback. Examples of back-channel feedback patterns include a regular expression pattern including a character string defined in advance, such as "yeah", "aha", "yes", and "I see".

When the text data matches the back-channel feedback pattern data (Yes at Step S42), the classifier 104 classifies the text data into second utterance data (Step S47).

When the text data does not match the back-channel feedback pattern data (No at Step S42), the classifier 104 determines whether the text data is included in the current first utterance data (see Step S45 described later) (Step S43).

When the text data is included in the current first utterance data (Yes at Step S43), the classifier 104 classifies the text data into second utterance data (Step S47).

When the text data is not included in the current first utterance data (No at Step S43), the classifier 104 determines whether a morpheme analysis result or a syntax analysis result of the text data matches predetermined analysis pattern data (Step S44).

The predetermined analysis pattern data represents a predetermined part-of-speech pattern and a predetermined syntax pattern. Examples of the predetermined part-of-speech pattern include a pattern in which information obtained by morpheme analysis is constituted by only nouns. Examples of the syntax pattern include a pattern in which information obtained by syntax analysis does not satisfy a modification structure of the subject and the predicate.

When the morpheme analysis result or the syntax analysis result of the text data matches the predetermined analysis pattern data (Yes at Step S44), the classifier 104 classifies the text data into second utterance data (Step S47). In other words, the text data that matches the predetermined analysis pattern data is text data representing repetition such as the above-mentioned text data 152.

When the morpheme analysis result or the syntax analysis result of the text data does not match the predetermined analysis pattern data (No at Step S44), the classifier 104 stores therein the text data as the current first utterance data (Step S45). The classifier 104 classifies the text data into first utterance data (Step S46).

The classifier 104 may omit the processing at a part of the steps among the processing at Steps S41 to Step S44. For example, the classifier 104 may omit the processing at Step S44.

The classifier 104 may execute at least one of the classification processing illustrated in FIG. 16 for classifying text data by using speech data or the classification processing illustrated in FIG. 17 for classifying text data by using speech recognition data, or may execute both. In the case where the classifier 104 executes both of the classification processing, when the classification results are different, the classifier 104 prioritizes either of the classification results. The prioritized classification result is, for example, the classification processing illustrated in FIG. 16 for classifying text data by using speech data.

Example of Method of Processing First Utterance Data

Figure 18:
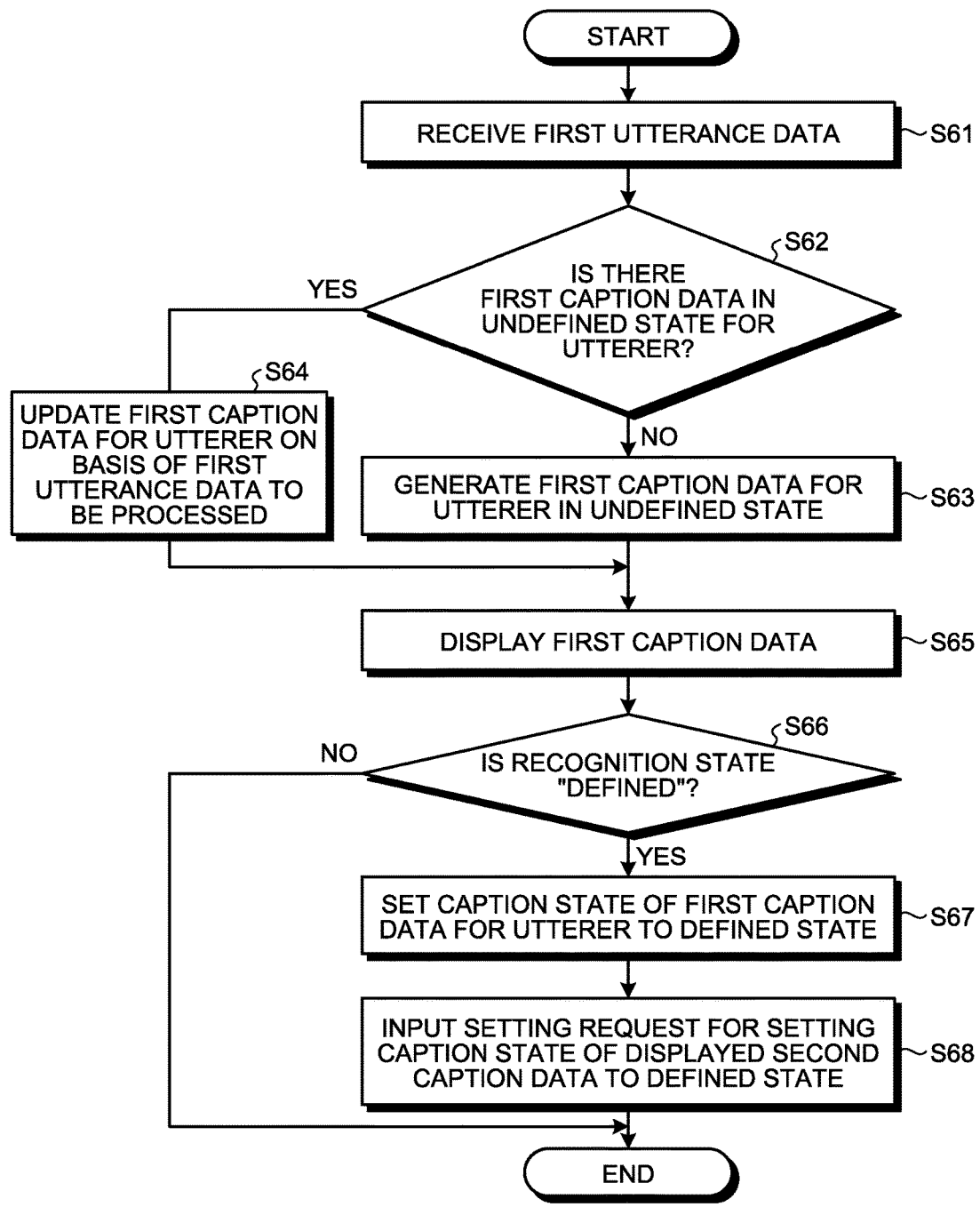
FIG. 18 is a flowchart illustrating an example of a method of processing first utterance data according to the first embodiment.

FIG. 18 is a flowchart illustrating an example of a method of processing first utterance data according to the first embodiment. First, the first caption controller 105 receives first utterance data to be processed from the classifier 104 (Step S61). Next, the first caption controller 105 determines whether there is first caption data in the undefined state for the utterer (Step S62).

When there is no first caption data in the undefined state (No at Step S62), the first caption controller 105 generates first caption data for the utterer in the undefined state (Step S63). The display controller 107 displays the first caption data (Step S65).

When there is first caption data in the undefined state (Yes at Step S62), the first caption controller 105 updates the first caption data on the basis of the first utterance data to be processed (Step S64). The display controller 107 displays the first caption data (Step S65).

Next, the first caption controller 105 determines whether the recognition state of the first utterance data received by the processing at Step S61 is "defined" (Step S66).

When the recognition state is not "defined" (No at Step S66), the processing is finished.

When the recognition state is "defined" (Yes at Step S66), the first caption controller 105 sets the caption state of the first caption data for the utterer to the defined state (Step S67). Next, the first caption controller 105 inputs a setting request for setting the caption state of the displayed second caption data to the defined state to the second caption controller 106 (Step S68). In this manner, the caption state of the displayed second caption data is set to the defined state by the second caption controller 106.

Example of Method of Processing Second Utterance Data

Figure 19:
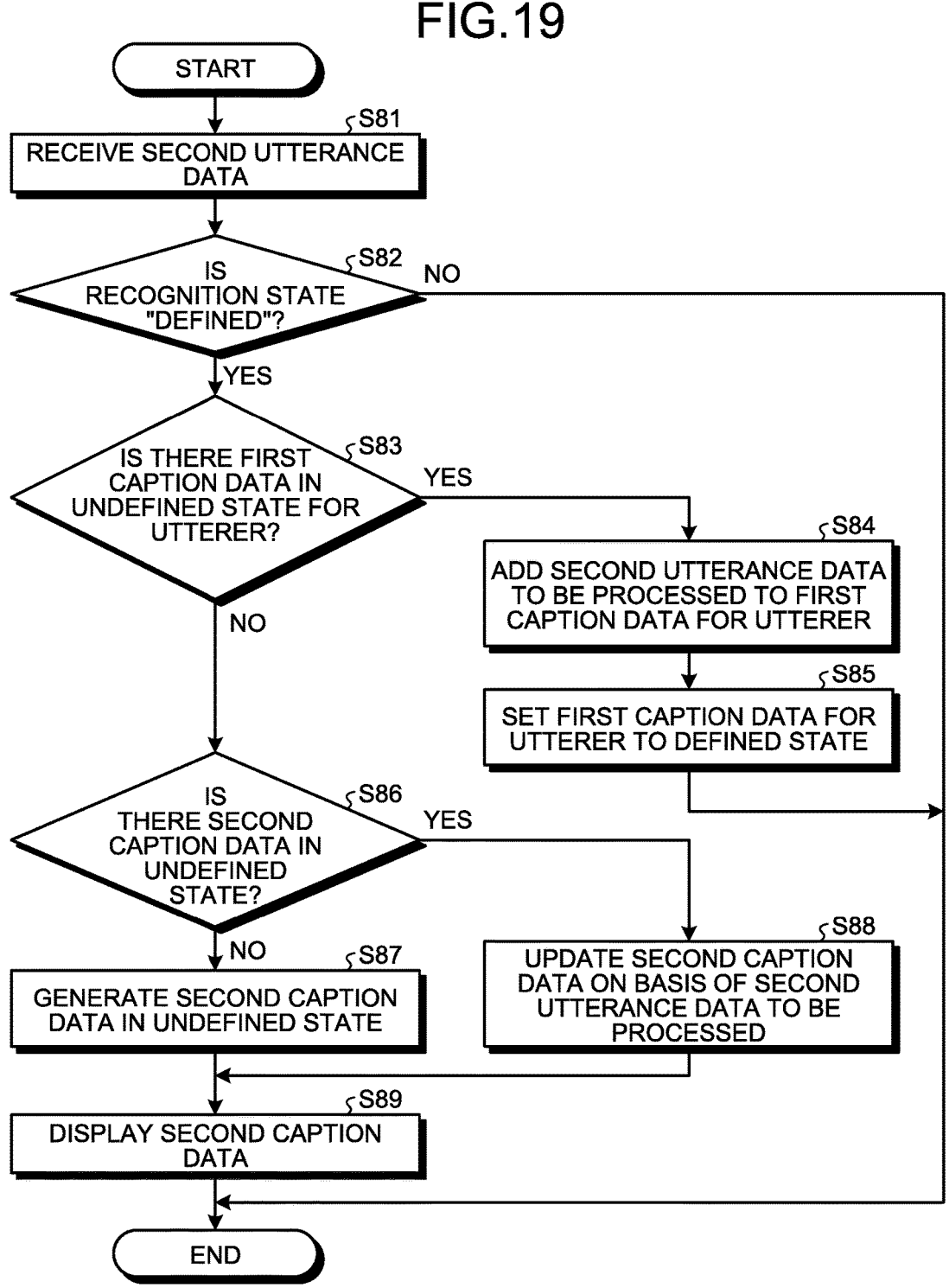
FIG. 19 is a flowchart illustrating an example of a method of processing second utterance data according to the first embodiment.

FIG. 19 is a flowchart illustrating an example of a method of processing second utterance data according to the first embodiment. First, the second caption controller 106 receives second utterance data to be processed from the classifier 104 (Step S81). Next, the second caption controller 106 determines whether the recognition state of the second utterance data received by the processing at Step S81 is "defined" (Step S82).

When the recognition state is not "defined" (No at Step S82), the processing is finished.

When the recognition state is "defined" (Yes at Step S82), the first caption controller 105 determines whether there is first caption data in the undefined state for the utterer (Step S83). Specifically, when the recognition state is "defined", the first caption controller 105 executes the processing at Step S83 when receiving a determination request for determining whether there is first caption data in the undefined state for the utterer from the second caption controller 106.

When there is first caption data in the undefined state for the utterer (Yes at Step S83), the first caption controller 105 adds second utterance data to be processed to the first caption data for the utterer (Step S84). The first caption controller 105 sets the caption state of the first caption data for the utterer to the defined state (Step S85).

When there is no first caption data in the undefined state for the utterer (No at Step S83), the second caption controller 106 determines whether there is second caption data in the undefined state (Step S86).

When there is no second caption data in the undefined state (No at Step S86), the second caption controller 106 generates second caption data in the undefined state (Step S87). The display controller 107 displays the second caption data (Step S89).

When there is second caption data in the undefined state (Yes at Step S86), the second caption controller 106 updates the second caption data on the basis of the second utterance data to be processed (Step S88). The display controller 107 displays the second caption data (Step S89).

The update method at Step S88 may be either addition or overwriting. For example, in the example in FIG. 10A, the case where the text data 153 is further added to the text data 151 is illustrated. When the update method is overwriting, the text data 153 is displayed in place of the text data 151.

The second caption controller 106 may update second caption data on the basis of the latest second utterance data independent of utterers without updating second caption data for each utterer. For example, the second caption controller 106 may update second caption data on the basis of second utterance data for a participant C later than second utterance data for a participant B.

The second caption controller 106 may update only second utterance data for a particular utterer. In other words, the display controller 107 may display only second utterance data for a particular utterer.

If the first caption data already displayed on the screen is scrolled out (cannot fit within the display screen) when the first caption controller 105 generates new first caption data, the first caption controller 105 sets the caption state of the scrolled-out first caption data in the undefined state to the defined state.

Similarly, if the second caption data already displayed on the screen is scrolled out when the second caption controller 106 generates new second caption data, the second caption controller 106 sets the caption state of the scrolled-out second caption data in the undefined state to the defined state.

As described above, in the conference support system 100 according to the first embodiment, the recognizer 103 recognizes, while identifying a speech section and a non-speech section included in speech data, text data representing a speech from the speech section. The classifier 104 classifies the text data into first utterance data representing a principal utterance and second utterance data representing an utterance other than the principal utterance. The first caption controller 105 generates first caption data for displaying the first utterance data without waiting for the finish of identification of a first speech section corresponding to the first utterance data. The second caption controller 106 generates second caption data for displaying the second utterance data after the finish of identification of a second speech section corresponding to the second utterance data. The display controller 107 controls the display of the first caption data and the second caption data.

In this manner, the conference support system 100 according to the first embodiment can prevent display data from being hard to view even when the displayed display data includes character strings obtained from speech recognition data in a conference where a plurality of persons are participated.

For example, the conference support system 100 according to the first embodiment can be used for a conference where hearing-impaired persons (those who need information support) are participated, thereby supporting hearing-impaired persons in grasping the contents in the conference. For another example, the conference support system 100 according to the first embodiment can be used for a conference where participants whose native languages are not the language in the conference are participated, thereby supporting the participants in grasping the contents in the conference.

While in the description in the first embodiment, the case where the first caption data and the second caption data are displayed on the same display screen in chronological order is described, the first caption data and the second caption data may be displayed on different display screens. For example, two display devices may be used such that a display screen for displaying the first caption data and a display screen for displaying the second caption data are separately provided to use different display formats for the first caption data and the second caption data.

While in the description in the first embodiment, the case where the functions of the conference support system 100 (see FIG. 2) are implemented by the client device 20, the speech recognition server device 30, and the conference support server device 40 is taken as an example, the functions of the conference support system 100 may be implemented by a single device (computer).

Second Embodiment

Next, a second embodiment is described. In the second embodiment, the same description as in the first embodiment is omitted, and differences from the first embodiment are described.

Device Configuration of Conference Support System

Figure 20:
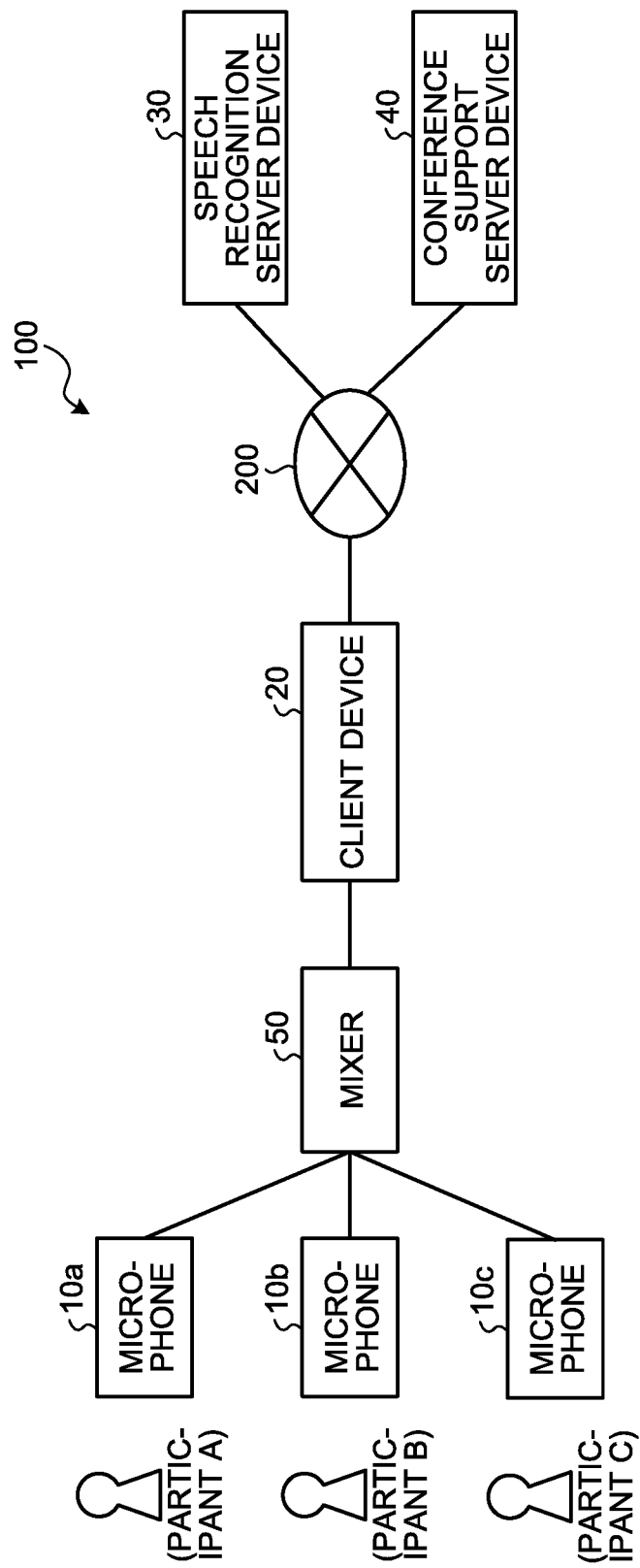
FIG. 20 is a diagram illustrating an example of a device configuration of a conference support system according to a second embodiment.

FIG. 20 is a diagram illustrating an example of a device configuration of a conference support system 100 according to the second embodiment. The conference support system 100 according to the second embodiment includes the microphones 10a to 10c, the client device 20, the speech recognition server device 30, the conference support server device 40, and a mixer 50. In other words, the second embodiment is different from the first embodiment in that the mixer 50 is added and the number of the client devices 20 is one.

The mixer 50 mixes three pieces of speech data received from the microphones 10a to 10c into single speech data. The mixer 50 transmits the mixed single speech data to the client device 20.

The client device 20 receives the speech data from the mixer 50, and transmits the speech data to the speech recognition server device 30.

The speech recognition server device 30 receives the speech data from the client device 20 via a network 200, and uses the speech data to perform utterer identification processing for identifying an utterer and speech recognition processing for recognizing a voice of the utterer. In other words, the second embodiment is different from the first embodiment in that the speech recognition server device 30 performs the utterer identification processing.

The conference support server device 40 receives speech recognition data from the speech recognition server device 30 via the network 200, and generates display data constituted by, for example, HTML tags on the basis of the speech recognition data.

The client device 20 receives the display data from the conference support server device 40 via the network 200, and displays the display data by using, for example, a web browser.

Next, an example of a functional configuration of the conference support system 100 according to the second embodiment is described.

Functional Configuration of Conference Support System

Figure 21:
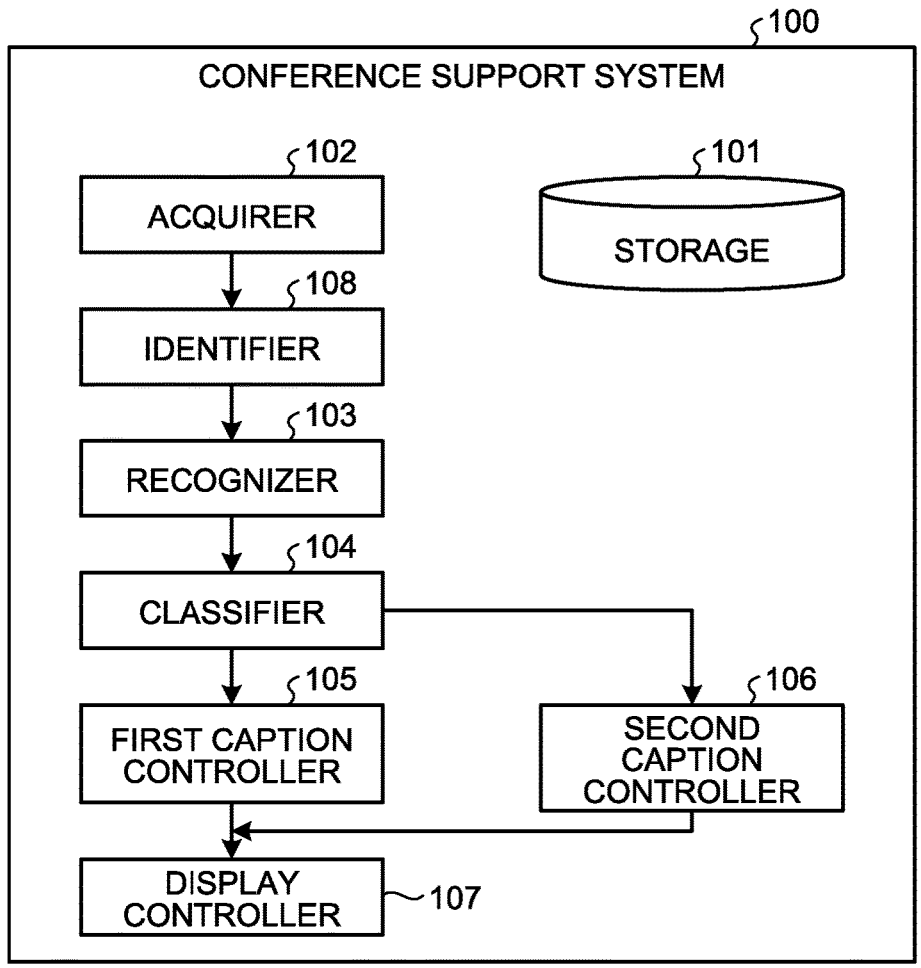
FIG. 21 is a diagram illustrating an example of a functional configuration of the conference support system according to the second embodiment.

FIG. 21 is a diagram illustrating an example of the functional configuration of the conference support system 100 according to the second embodiment. The conference support system 100 according to the second embodiment includes the storage 101, the acquirer 102, the recognizer 103, the classifier 104, the first caption controller 105, the second caption controller 106, the display controller 107, and an identifier 108. In other words, the second embodiment is different from the first embodiment in that the identifier 108 is further added to the functional configuration in the first embodiment.

The acquirer 102 acquires single speech data obtained by mixing a plurality of pieces of speech data. For example, the acquirer 102 is implemented by the above-mentioned microphones 10a to 10c and mixer 50.

The identifier 108 receives the speech data from the acquirer 102, and identifies an utterer from the speech data. For example, the identifier 108 is implemented by the above-mentioned speech recognition server device 30.

The recognizer 103 subjects the speech data to speech recognition for each utterer identified by the identifier 108.

The description of the classifier 104, the first caption controller 105, the second caption controller 106, and the display controller 107 is the same as in the first embodiment and thus omitted.

As described above, the conference support system 100 according to the second embodiment can obtain the same effects as in the above-mentioned first embodiment even when speech data acquired by the mixer 50 connected to the microphones 10 is used.

Lastly, an example of a hardware configuration of the client device 20, the speech recognition server device 30, and the conference support server device 40 according to the first and second embodiments is described.

Example of Hardware Configuration

Figure 22:
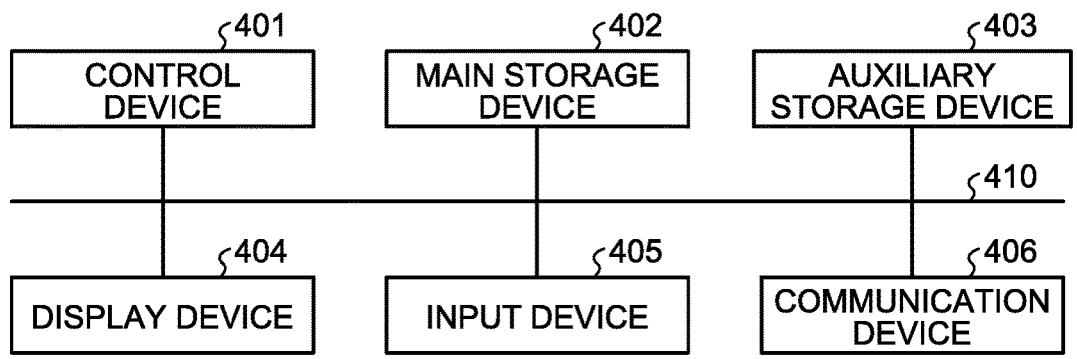
FIG. 22 is a diagram illustrating an example of a hardware configuration of a client device, a speech recognition server device, and a conference support server device according to the first and second embodiments.

FIG. 22 is a diagram illustrating an example of the hardware configuration of the client device 20, the speech recognition server device 30, and the conference support server device 40 according to the first and second embodiments. The client device 20, the speech recognition server device 30, and the conference support server device 40 according to the first and second embodiments include a control device 401, a main storage device 402, an auxiliary storage device 403, a display device 404, an input device 405, and a communication device 406. The control device 401, the main storage device 402, the auxiliary storage device 403, the display device 404, the input device 405, and the communication device 406 are connected to one another via a bus 410.

The control device 401 executes a computer program read from the auxiliary storage device 403 to the main storage device 402. The main storage device 402 is a memory, such as a read only memory (ROM) and a random access memory (RAM). The auxiliary storage device 403 is a memory card or a hard disk drive (HDD).

The display device 404 displays information. For example, the display device 404 is a liquid crystal display. The input device 405 receives an input of information. For example, the input device 405 is a keyboard and a mouse. The display device 404 and the input device 405 may be a liquid crystal touch panel having both a display function and an input function. The communication device 406 communicates with other devices.

The computer program executed by the client device 20, the speech recognition server device 30, and the conference support server device 40 according to the first and second embodiments is stored in a computer-readable storage medium, such as a compact disc read-only memory (CD-ROM), a memory card, a compact disc-recordable (CD-R), and a digital versatile disc (DVD), in an installable format or an executable format, and provided as a computer program product.

The computer program executed by the client device 20, the speech recognition server device 30, and the conference support server device 40 according to the first and second embodiments may be stored on a computer connected to a network such as the Internet, and provided by being downloaded via the network. The computer program executed by the client device 20, the speech recognition server device 30, and the conference support server device 40 according to the first and second embodiments may be provided via a network such as the Internet without being downloaded.

The computer program executed by the client device 20, the speech recognition server device 30, and the conference support server device 40 according to the first and second embodiments may be embedded in a ROM or other storage media in advance and provided.

The computer program executed by the client device 20, the speech recognition server device 30, and the conference support server device 40 according to the first and second embodiments serves as a module configuration including functions implementable by the computer program in the functional configuration of the conference support system 100 according to the first and second embodiments.

The functions implemented by a computer program are loaded on the main storage device 402 by the control device 401 reading the computer program from a storage medium such as the auxiliary storage device 403 and executing the read computer program. In other words, the functions implemented by the computer program are generated on the main storage device 402.

Part or whole of the functions of the conference support system 100 according to the first and second embodiments may be implemented by hardware such as an integrated circuit (IC).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A conference support system comprising:
   a recognizer, implemented in computer hardware, configured to recognize text data corresponding to speech from a speech section and configured to distinguish between the speech section and a non-speech section included in speech data;
   a classifier, implemented in computer hardware, configured to classify the text data into first utterance data representing a principal utterance and second utterance data representing an utterance other than the principal utterance;
   a first caption controller, implemented in computer hardware, configured to generate first caption data for displaying the first utterance data without waiting for identification of a first speech section corresponding to the first utterance data to finish;
   a second caption controller, implemented in computer hardware, configured to generate second caption data for displaying the second utterance data after identification of a second speech section corresponding to the second utterance data finishes; and
   a display controller, implemented in computer hardware, configured to control a display of the first caption data and the second caption data, wherein the classifier classifies the text data into the first utterance data when an average power of the speech data is equal to or more than a first threshold, when a length of the first speech section is equal to or more than a second threshold, and when a difference between a feature of a voice included in the first speech section and an average of features of the speech data of utterers corresponding to first utterance data uttered in past is equal to or less than a third threshold.

2. The system according to claim 1, wherein the display controller displays the first caption data in a first display format, and displays the second caption data in a second display format.

3. The system according to claim 1, wherein the classifier classifies the text data into the second utterance data when a number of characters included in the text data is equal to or less than a fourth threshold.

4. The system according to claim 1, wherein the classifier classifies the text data into the second utterance data when the text data matches back-channel feedback pattern data representing particular back-channel feedback.

5. The system according to claim 1, wherein the classifier classifies the text data into the second utterance data when a morpheme analysis result or a syntax analysis result of the text data matches a particular analysis pattern.

6. The system according to claim 1, wherein
the first caption controller generates the first caption data for each utterer, and
the second caption controller generates the second caption data that is not distinguished for each utterer.

7. The system according to claim 1, wherein
the first caption controller generates the first caption data by using a HyperText Markup Language (HTML) tag,
the second caption controller generates the second caption data by using an HTML tag, and
the display controller includes a web browser.

8. A conference support method comprising:
recognizing, text data corresponding to speech from a speech section and configured to distinguish between the speech section and a non-speech section included in speech data;
classifying the text data into first utterance data representing a principal utterance and second utterance data representing an utterance other than the principal utterance;
generating first caption data for displaying the first utterance data without waiting for identification of a first speech section corresponding to the first utterance data to finish;
generating second caption data for displaying the second utterance data after identification of a second speech section corresponding to the second utterance data finishes; and
controlling a display of the first caption data and the second caption data,
wherein classifying the text data into the first utterance data when an average power of the speech data is equal to or more than a first threshold, when a length of the first speech section is equal to or more than a second threshold, and when a difference between a feature of a voice included in the first speech section and an average of features of the speech data of utterers corresponding to first utterance data uttered in past is equal to or less than a third threshold.

9. A computer program product comprising a non-transitory computer-readable medium containing a program, wherein the program, when executed by a computer, causes the computer to execute:
recognizing, text data corresponding to speech from a speech section and configured to distinguish between the speech section and a non-speech section included in speech data;
classifying the text data into first utterance data representing a principal utterance and second utterance data representing an utterance other than the principal utterance;
generating first caption data for displaying the first utterance data without waiting for identification of a first speech section corresponding to the first utterance data to finish;
generating second caption data for displaying the second utterance data after identification of a second speech section corresponding to the second utterance data finishes; and
controlling a display of the first caption data and the second caption data,
wherein classifying the text data into the first utterance data when an average power of the speech data is equal to or more than a first threshold, when a length of the first speech section is equal to or more than a second threshold, and when a difference between a feature of a voice included in the first speech section and an average of features of the speech data of utterers corresponding to first utterance data uttered in past is equal to or less than a third threshold.

* * * * *